United States Patent
Zheng et al.

(10) Patent No.: US 12,047,519 B2
(45) Date of Patent: Jul. 23, 2024

(54) PHYSICAL UNCLONABLE FUNCTION BASED MUTUAL AUTHENTICATION AND KEY EXCHANGE

(71) Applicant: Nanyang Technological University, Singapore (SG)

(72) Inventors: Yue Zheng, Singapore (SG); Chip Hong Chang, Singapore (SG); Wenye Liu, Singapore (SG)

(73) Assignee: Nanyang Technological University, Singapore (SG)

( * ) Notice: Subject to any disclaimer, the term of this patent is extended or adjusted under 35 U.S.C. 154(b) by 220 days.

(21) Appl. No.: 17/866,332

(22) Filed: Jul. 15, 2022

(65) Prior Publication Data

US 2023/0032099 A1 Feb. 2, 2023

(30) Foreign Application Priority Data

Jul. 15, 2021 (SG) .......................... 10202107780Q

(51) Int. Cl.
*H04L 29/06* (2006.01)
*H04L 9/06* (2006.01)
*H04L 9/08* (2006.01)
*H04L 9/32* (2006.01)

(52) U.S. Cl.
CPC .......... *H04L 9/3278* (2013.01); *H04L 9/0618* (2013.01); *H04L 9/0838* (2013.01); *H04L 9/3236* (2013.01)

(58) Field of Classification Search
CPC ... H04L 9/3278; H04L 9/0618; H04L 9/0838; H04L 9/3236; H04L 9/0841; H04L 9/14; H04L 9/40; H04L 63/0428; H04L 63/061; H04L 63/0869; H04L 2209/805
See application file for complete search history.

(56) References Cited

U.S. PATENT DOCUMENTS

| | | | |
|---|---|---|---|
| 9,367,701 B2 * | 6/2016 | Merchan | ................... G09C 1/00 |
| 2021/0091952 A1* | 3/2021 | Wentz | .................... H04L 9/3278 |
| 2022/0021526 A1* | 1/2022 | Dugardin | ............... H04L 9/3073 |
| 2023/0032099 A1* | 2/2023 | Zheng | ........................ H04L 9/14 |
| 2023/0155825 A1* | 5/2023 | Wu | ........................ H04L 9/3231 |
| | | | 380/44 |
| 2023/0246812 A1* | 8/2023 | Davis | .................... H04L 9/0819 |
| | | | 713/171 |

OTHER PUBLICATIONS

J. R. Wallrabenstein, "Practical and secure IoT device authentication using physical unclonable functions," in Proc. 2016 IEEE 4th Int. Conf. Future Internet Things Cloud (FiCloud), Vienna, Austria: IEEE, Aug. 2016, pp. 99-106.

(Continued)

*Primary Examiner* — Mahfuzur Rahman
(74) *Attorney, Agent, or Firm* — Conley Rose, P.C.

(57) ABSTRACT

Methods and endpoint nodes and controllers are disclosed for mutual authentication and key exchange. In an embodiment, physical unclonable function circuits on the endpoint nodes are used in combination with key masks to allow mutual authentication and key exchange between the endpoint nodes.

20 Claims, 6 Drawing Sheets

(56) References Cited

OTHER PUBLICATIONS

T. Idriss, et al., "Lightweight highly secure PUF protocol for mutual authentication and secret message exchange," in Proc. 2017 IEEE Int. Conf. RFID Technol. Appl. (RFID-TA), Warsaw, Poland: IEEE, 2017, pp. 214-219.

P. Gope, et al., "Lightweight and privacy-preserving two-factor authentication scheme for IoT devices," IEEE Internet Things J., vol. 6, No. 1, pp. 580-589, Feb. 2018.

J. Chatterjee, et al., "Building PUF based authentication and key exchange protocol for IoT without explicit CRPs in verifier database," IEEE Trans. Dependable Secure Comput., vol. 16, No. 3, pp. 424-437, May-Jun. 2018.

M. Barbareschi, et al., "A PUF-based mutual authentication scheme for cloud-edges IoT systems," Future Generation Comput. Syst., vol. 101, pp. 246-261, Dec. 2019.

M. N. Aman, et al., "Mutual authentication in IoT systems using physical unclonable functions," IEEE Internet Things J., vol. 4, No. 5, pp. 1327-1340, Oct. 2017.

S. Li, et al., "A provably secure and practical PUF-based end-to-end mutual authentication and key exchange protocol for IoT," IEEE Sensors J., vol. 21, No. 4, Feb. 2021.

\* cited by examiner

| Protocols | Mutual Authentication | Secure Session Key | No Server Participation | NVM Secure Free | PFS |
|---|---|---|---|---|---|
| RoT2017 [10] | ✓ | ✓ | × | ✓ | × |
| TDSC2018 [12] | ✓ | × | × | × | ✓ |
| Elsevier2019 [15] | ✓ | ✓ | × | ✓ | × |
| ISPN2021 [17] | ✓ | ✓ | ✓ | ✓ | × |
| Proposed protocol A | ✓ | × | ✓ | ✓ | × |
| Proposed protocol B | ✓ | ✓ | ✓ | ✓ | ✓ |

✓: the security feature is provided, ×: the security feature is not provided.

PHYSICAL UNCLONABLE FUNCTION BASED MUTUAL AUTHENTICATION AND KEY EXCHANGE

CROSS-REFERENCE TO RELATED APPLICATIONS

The present application claims priority to Singapore Application No. SG 10202107780Q filed with the Intellectual Property Office of Singapore on Jul. 15, 2021, which is incorporated herein by reference in its entirety for all purposes.

TECHNICAL FIELD

The present disclosure relates to cryptography and in particular to mutual authentication and key exchange in client-to-client, peer-to-peer and die-to-die systems such as internet of things systems and chiplets of an integrated circuit.

BACKGROUND

The Internet of Things (IoT) regime can be roughly classified into two categories, i.e., database-driven IoT and peer-to-peer (P2P) IoT. For database-driven IoT, the connections between two IoT endpoint devices are established indirectly through a server, which is a common approach for IoT connection. Data collected from the IoT devices will be transmitted to and stored in the server's database and the retrieval of data can be achieved by sending a request to the server. By contrast, P2P IoT enables direct connection between two IoT endpoints, which provides lower-latency performance and higher-privacy level compared to server-centric database-driven IoT. As data collectors, IoT endpoints have access to high-value assets and confidential information. Since they are easily accessible and resource constrained, they are also alluring targets of attack, especially when the intelligent autonomous endpoint devices are allowed to interact or exchange sensitive data directly with each other endpoints in a smart environment. Authentication and secure key exchange between two endpoints are the crucial first line of defense to prevent fake endpoints from exfiltrating data and holding information hostage. Unfortunately, legacy security solutions, despite sufficiently mature, do not transfer convincingly to the P2P IoT scenarios due to the heterogeneity, and resource and memory constraints of IoT devices.

To this end, Physical Unclonable Function (PUF) stands out as a promising embodiment to facilitate secure authentication and key exchange of IoT devices [1]-[3]. A PUF can be viewed as a physical circuit realization of a random oracle by harnessing the minute variance in modern semiconductor manufacturing processes. The lynchpin of PUF is the irreversible random mapping of a digital input (known as a challenge) to a digital output (known as a response). The challenge-response mapping is very similar to a cryptographic hash function except that the hardness to invert the function is originated from the physical disorder instead of the computational complexity theory. The chip-to-chip variances of a manufacturing process can be harvested by the PUF circuit. With enough basic PUF cells, many unique challenge-response pairs (CRPs) of arbitrary length can be generated from each chip for a huge number of manufactured chips. Although the PUF circuit itself is easy to make and the responses can be readily measured, it is practically infeasible to physically clone a PUF instance to reproduce the same CRPs. More importantly, no secret key needs to be stored locally on a device as the PUF can generate the device-specific secret (response) only upon request (by applying a challenge). Once the required number of CRPs have been successfully measured and enrolled into a secure server database, the external measurement interface of the PUF responses can be permanently disabled. Since the entire set of CRPs is intricately embodied in the nano-structure of the PUF, any active manipulation of the PUF circuit internals will cause dysfunction of the challenge-response mapping mechanism and destroy the secret. This tamper-evident property of PUF and its ability to securely identify a device by interrogation without the need for a permanent secret residence in anti-temper memory largely reduce the risks of many powerful hardware attack vectors such as reverse engineering, probing and fault injection attacks on physically accessible devices.

Using PUF for device authentication requires the verifier to keep a copy of its prover's CRPs. This is a common practice in PUF-based authentication protocol in database-driven IoT as the server has the computing power and memory resources to securely store the database of the CRPs of all its interlocutors. However, this requirement becomes impractical when mutual authentication has to be performed directly between two end-devices for secure communication in P2P IoT applications. IoT end-devices are usually small, low cost and resource constrained, which render classical recipes [2], [3] of PUF-based mutual authentication between device and server inapplicable, when one end-device needs to communicate with several other end-devices. Besides, storing the prover's CRPs in the verifier device allows the latter to impersonate the prover, which rules out the applicability of traditional PUF-based authentication scheme in the P2P IoT scenarios.

In summary, P2P IoT enables low latency with high security and privacy communication provided that direct mutual authentication and key exchange between resource-constrained IoT devices can be achieved. PUF as a lightweight and generate-on-the-fly device signature provider is promising for P2P IoT, but classical PUF-based protocols require a CRP copy of the prover to be stored in the verifier's database, which introduces serious security problems as the verifier is also a less-powerful edge device in P2P IoT.

SUMMARY

According to a first aspect of the present disclosure, a method, in a first endpoint node, of authentication and key exchange with a second endpoint node is provided. The method comprises: generating a first cryptographic nonce; sending a request message to the second endpoint node, the request message comprising the first cryptographic nonce; determining a challenge for a physical unclonable function circuit of the first endpoint node and a key mask designated for the first endpoint node to use for authentication and key exchange with the second endpoint node; applying the challenge to the physical unclonable function circuit of the first endpoint node and thereby generating a physical unclonable function response; obtaining a first intermediary secret value from the physical unclonable function response; receiving a response message from the second endpoint node, the response message comprising: first ciphertext and a second cryptographic nonce, the first ciphertext having been generated by the second node from the first cryptographic nonce and first session key material using the first intermediary secret value; decrypting the first ciphertext in the response message using the first intermediary secret value to obtain a decrypted first cryptographic nonce and decrypted first session key material; comparing the decrypted first cryptographic nonce with the first cryptographic nonce generated on the first endpoint node and authenticating the second endpoint node if the decrypted first cryptographic nonce matches the first cryptographic nonce generated on the first endpoint node; obtaining a second intermediary secret value from the first intermediary secret value using the key mask designated for the first endpoint node to use for authentication and key exchange with the second endpoint node; generating second session key material; generating second ciphertext from the second session key material and the second cryptographic nonce using the second intermediary secret value; sending the second ciphertext to the second node; and generating a session key for encrypted communication with the second endpoint node from the first session key material and the second session key material.

In an embodiment, the first intermediary secret value is obtained by applying a hash function to physical unclonable function response and an identifier of the second endpoint node and the second intermediary secret value is obtained from an XOR operation of the key mask and a hash function of the first intermediary secret value.

In an embodiment, generating second ciphertext from the second session key material and the second cryptographic nonce using the second intermediary secret value comprises encrypting the second session key material and the second cryptographic nonce using the second intermediary secret value.

In an embodiment, generating second ciphertext from the second session key material and the second cryptographic nonce using the second intermediary secret value comprises using a trapdoor function. This provides an enhanced version of the method with perfect forward secrecy (PFS).

In an embodiment, the trapdoor function comprises carrying out a point multiplication over an elliptic curve on the second session key material to obtain an elliptic curve point multiplied second session key material and encrypting the elliptic curve point multiplied second session key material and the second cryptographic nonce using the second intermediary secret value.

In an embodiment, decrypting the first ciphertext using the first intermediary secret value and/or encrypting the second session key material and the second cryptographic nonce using the second intermediary secret value comprises applying an authenticated encryption method.

In an embodiment, the authenticated encryption method is a counter with cipher block chaining message authentication code method, a Galois/Counter mode method, an offset codebook mode method or an encrypt-then-authenticate-then-translate method.

According to a second aspect of the present disclosure, a method of facilitating authentication and encrypted communication between a first endpoint node and a second endpoint node is provided. The method comprises: selecting a first challenge for a physical unclonable function circuit of the first endpoint node and a second challenge for a physical unclonable function circuit of the second endpoint node, wherein the physical unclonable function circuit of the first endpoint node outputs a first challenge response in response to the first challenge and physical unclonable function circuit of the second endpoint node outputs a second challenge response in response to the second challenge; generating a first key mask using the first challenge response and the second challenge response such that the first key mask encodes a first intermediary secret value of the first endpoint node and a first intermediary secret value of the second endpoint node; generating a second key mask using the first challenge response and the second challenge response such that the second key mask encodes a second intermediary secret value of the first endpoint node and a second intermediary secret value of the second endpoint node; providing a key mask for the second endpoint node encrypted by the second challenge response to the second endpoint node; and providing a key mask for the first endpoint node encrypted by the first challenge response to the first endpoint node.

The key mask for the first endpoint node and the key mask for the second endpoint node are interchangeable. Thus, the key mask for the first endpoint node may be the first key mask or the second key mask and the key mask for the second endpoint node is the other of the first key mask and the second key mask.

Both challenge responses are used to generate the pair of intermediary secret values of the first key mask. The pair of intermediary secret values of the second key mask is the hash function of the intermediary secret values of the first key mask. This way, the first endpoint node can recover the intermediary secret value of the second endpoint node from the second key mask using its challenge response (which is the first challenge response). The recovered intermediary secret value is used by the first endpoint node to generate the ciphertext for the second endpoint node to decrypt. The second end point node can do the same using the two intermediate values from the first key mask.

In an embodiment, the first intermediary secret value of the first endpoint node is obtained from a hash function of a concatenation of the first challenge response and an identifier of the second endpoint node, the first intermediary secret value of the second endpoint node is obtained from a hash function of a concatenation of the second challenge response and an identifier of the first endpoint node, the second intermediary secret value of the first endpoint node is obtained from a hash function of the first intermediary secret value of the first endpoint node, and the second intermediary secret value of the second endpoint node is obtained from a hash function of the first intermediary secret value of the second endpoint node.

In an embodiment, the method further comprises authenticating the first endpoint node by sending a first cryptographic nonce to the first endpoint node and comparing a response received from the first endpoint node with an expected function of the first cryptographic nonce and the first challenge response.

In an embodiment, the method further comprises generating first error correcting code helper data and second error correcting code helper data respectively using the first challenge response and the second challenge response.

According to a third aspect of the present disclosure, an endpoint node is provided. The endpoint node comprises: a physical unclonable function circuit configured to generate physical challenge responses in response to respective challenges; a memory storing: an indication of an identifier of a second endpoint node; an indication of a challenge designated for the second endpoint node to use for authentication and key exchange; an indication of a challenge designated for the endpoint node to use for authentication and key exchange with the second endpoint node; and a key mask designated for the endpoint node to use for authentication and key exchange with the second endpoint node; a communication interface configured for communication with the second endpoint node; and a processor configured to: generating a first cryptographic nonce; send a request message to the second endpoint node; the request message comprising the first cryptographic nonce; applying the challenge designated for the endpoint node to use for authentication and key exchange with the second endpoint node to the physical unclonable function circuit and thereby generate a physical unclonable function response; obtain a first intermediary secret value from the physical unclonable function response; receive a response message from the second endpoint node, the response message comprising: first ciphertext and a second cryptographic nonce, the first ciphertext having been generated by the second node from the first cryptographic nonce and first session key material using the first intermediary secret value; decrypt the first ciphertext in the response message using the first intermediary secret value to obtain a decrypted first cryptographic nonce and decrypted first session key material; compare the decrypted first cryptographic nonce with the first cryptographic nonce generated on the first endpoint node and authenticating the second endpoint node if the decrypted first cryptographic nonce matches the first cryptographic nonce generated on the first endpoint node; obtain a second intermediary secret value from the first intermediary secret value using the key mask designated for the first endpoint node to use for authentication and key exchange with the second endpoint node; generate second session key material; generate second ciphertext from the second session key material and the second cryptographic nonce using the second intermediary secret value; send the second ciphertext to the second node; and generate a session key for encrypted communication with the second endpoint node from the first session key material and the second session key material.

According to a fourth aspect of the present invention, an endpoint node which acts as a respondent to an authentication request from a second endpoint node is provided. The endpoint node comprises: a physical unclonable function circuit configured to generate physical challenge responses in response to respective challenges; a memory storing: an indication of an identifier of a second endpoint node; an indication of a challenge designated for the second endpoint node to use for authentication and key exchange; an indication of a challenge designated for the endpoint node to use for authentication and key exchange with the second endpoint node; a key mask designated for the endpoint node to use for authentication and key exchange with the second endpoint node; a communication interface configured for communication with the second endpoint node; and a processor configured to: receive a request message from the second endpoint node, the request message comprising the first cryptographic nonce; apply the challenge designated for the endpoint node to use for authentication and key exchange with the second endpoint node to the physical unclonable function circuit and thereby generate a physical unclonable function response; obtain a first intermediary secret value of the endpoint node from the physical unclonable function response; obtain a first intermediary secret value of the second endpoint node using the key mask designated for the endpoint node to use for authentication and key exchange with the second endpoint node; generate first session key material; generate first ciphertext from the first cryptographic nonce and first session key material using the first intermediary secret value of the second endpoint node; generate a second cryptographic nonce; send the first ciphertext and the second cryptographic nonce to the second endpoint node; receive second ciphertext from the second endpoint node; decrypt the second ciphertext using the second intermediary secret value of the endpoint node to obtain a decrypted second cryptographic nonce and decrypted second session key material; compare the decrypted second cryptographic nonce with the second cryptographic nonce generated on the endpoint node and authenticate the second endpoint node if the second ciphertext can be successfully decrypted and the decrypted second cryptographic nonce matches the second cryptographic nonce generated on the endpoint node; generate a session key for encrypted communication with the second endpoint node from the first session key material and the second session key material.

In an embodiment, the first intermediary secret value is obtained by applying a hash function to physical unclonable function response and an identifier of the second endpoint node, and the second intermediary secret value is obtained by applying a hash function to the first intermediary secret value.

In an embodiment, the processor is further configured to generate the second ciphertext from the second session key material and the second cryptographic nonce using the second intermediary secret value by encrypting the second session key material and the second cryptographic nonce wing the second intermediary secret value.

In an embodiment, the processor is further configured to generate second ciphertext from the second session key material and the second cryptographic nonce using the second intermediary secret value comprises using a trapdoor function.

In an embodiment, the trapdoor function comprises carrying out a point multiplication over an elliptic curve on the second session key material to obtain an elliptic curve point multiplied second session key material and encrypting the elliptic curve point multiplied second session key material and the second cryptographic nonce using the second intermediary secret value.

In an embodiment, the processor is further configured to decrypt the first ciphertext using the first intermediary secret value and/or encrypting the second session key material and the second cryptographic nonce using the second intermediary secret value by applying an authenticated encryption method.

In an embodiment, the authenticated encryption method is a counter with cipher block chaining message authentication code method, a Galois/Counter mode method, an offset codebook mode method or an encrypt-then-authenticate-then-translate method.

In an embodiment, the memory further stores error correction code helper data for the reconciliation of the challenge response generated by the physical unclonable function circuit, and the processor is further configured to use the error correction code helper data to apply the challenge designated for the endpoint node to use for authentication and key exchange with the second endpoint node to the physical unclonable function circuit and thereby generate a physical unclonable function response According to a fourth aspect of the present disclosure, a controller for facilitating authentication and encrypted communication between a first endpoint node and a second endpoint node is provided. The controller is configured to: select a first challenge for a physical unclonable function circuit of the first endpoint node and a second challenge for a physical unclonable function circuit of the second endpoint node, wherein the physical unclonable function circuit of the first endpoint node outputs a first challenge response in response to the first challenge and physical unclonable function circuit of the second endpoint node outputs a second challenge response in response to the second challenge; generate a first key mask for the second endpoint node using both challenge responses such that the first key mask encodes a first pair of intermediary secret values of both endpoint nodes; generate a second key mask for the first endpoint node using the first pair of intermediary values such that the second key mask encodes a second pair of intermediary secret values of both endpoint nodes; provide the first key mask to the second endpoint node; and provide the second key mask to the first endpoint node.

In an embodiment, an intermediary secret value of the first pair of intermediary secret values for the first key mask is obtained from a hash function of a concatenation of the second challenge response and an identifier of the first endpoint node. The other intermediary secret value of the first key mask is obtained from a hash function of a concatenation of the first challenge response and an identifier of the second endpoint node. The second pair of intermediary secret values for the second key mask is obtained from a hash function of the first pair of intermediary secret values.

BRIEF DESCRIPTION OF THE DRAWINGS

In the following, embodiments of the present invention will be described as non-limiting examples with reference to the accompanying drawings in which:

FIG. 6 is a table showing a comparison of protocols against a list of security features, including mutual authentication, secure session key, the requirement of server participation, NVM for storage of secret locally and PFS;

FIG. 7 is a table showing a comparison of computational complexity for protocols; and FIG. 8 is a table showing a comparison of communication and storage costs for protocols.

DETAILED DESCRIPTION

The present disclosure relates to physical unclonable function (PUF) based protocols for mutual authentication and key exchange between endpoints in peer-to-peer systems.

A PUF may be used as a "device fingerprint" for individual device authentication [2], [3]. A typical PUF-based authentication process is as follows. An enrolment phase is required to be carried out securely in a controlled environment once before the PUF can be deployed in the field for device authentication. During the enrolment phase, an adequate number of challenge response pairs (CRPs) of the PUF has to be collected and stored in the verifier's database. In the authentication phase, the verifier randomly selects a CRP from its database and then transmits the challenge to the prover. The prover obtains a response by applying this challenge to its PUF and sends the response back to the verifier. By comparing the received PUF response with the enrolled one, the verifier can authenticate the prover's device. A typical PUF-based authentication scheme requires the verifier to safely store a CRP database of the prover's PUF. This is easier to achieve if the verifier is a powerful server. If direct authentication of P2P IoT devices is to be achieved without a proxy server this scheme is infeasible as the verifier, an IoT endpoint, has limited resources to ensure the secure storage of the CRPs. As a result, PUF-based authentication schemes without the CRP storage in both endpoint devices of the verifier and the prover are desperately needed in such P2P IoT applications.

Figures 1, 2:
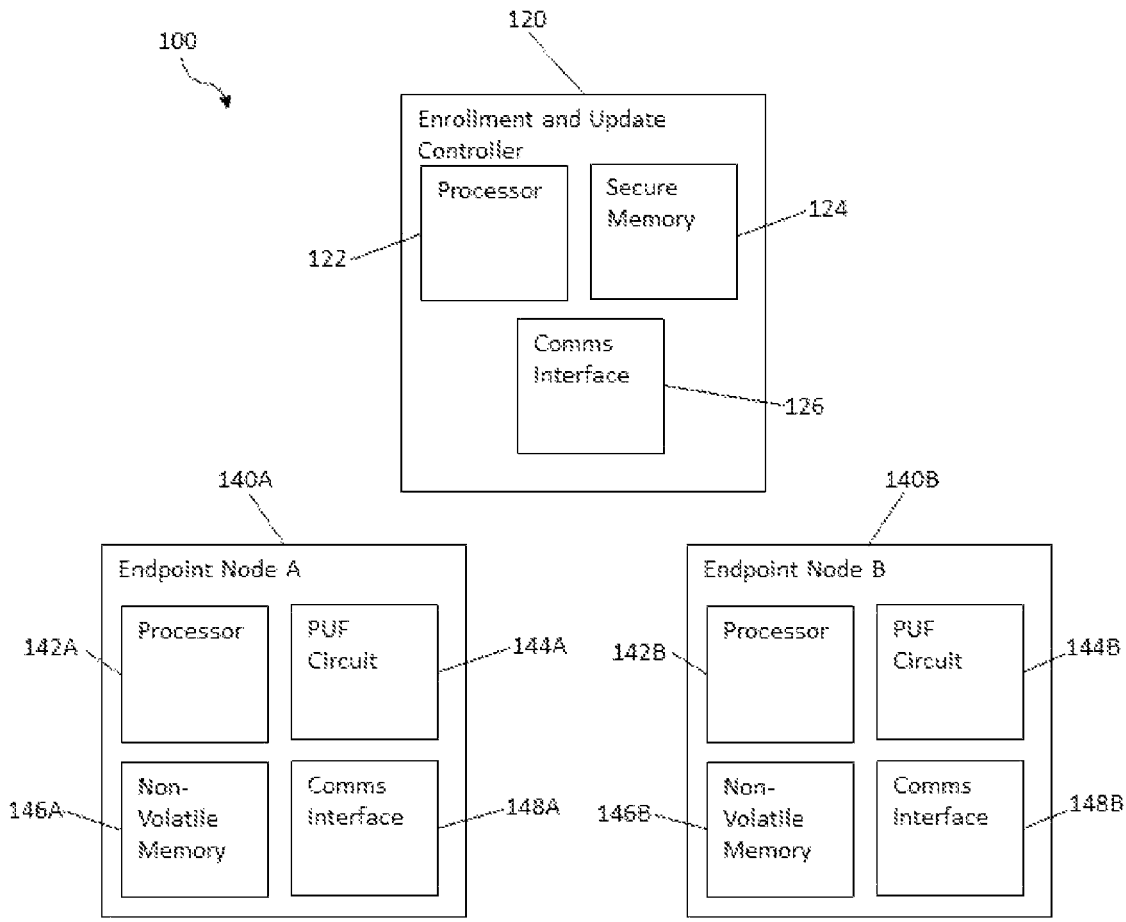
FIG. 1 is a block diagram showing a system for physical unclonable function based authentication and key exchange according to an embodiment of the present invention.
FIG. 2 is a table showing data stored in an enrollment and update controller of a system for physical unclonable function based authentication and key exchange according to an embodiment of the present invention.

FIG. 1 is a block diagram showing a system for physical unclonable function based authentication and key exchange according to an embodiment of the present invention. The system 100 comprises an enrollment and update controller 120 and two endpoint nodes: endpoint node A 140A and endpoint node B 140B. The two endpoint nodes can also be two dies in a heterogeneous integrated circuit package to enable highly secure die-to-die communications between chiplets. This system can also be used to enhance the security of chiplets, which may involve communication between chiplets manufactured by different foundries and outsourced IP cores from multiple venders. Such trust assurance is important for chiplets in the aerospace, defense, industrial and automotive markets. It is envisaged that systems which implement the protocols described herein may be implemented with more than two endpoint nodes. Since the update and authentication processes take place with pairs of endpoint nodes, for larger systems, the processes described herein are carried out between pairs of endpoint nodes.

The enrollment and update controller 120 comprises a processor 122, a secure memory 124 and a communications interface 126. Endpoint node A 140A comprises a processor 142A, a PUF circuit 144A, a non-volatile memory 146A and a communications interface 148A. Endpoint node B comprises a processor 142B, a PUF circuit 144B, a non-volatile memory 146B and a communications interface 148B. The PUF circuit can be any weak or strong PUF, such as any of the delay-based PUFs (e.g., arbiter and ring-oscillator PUFs), memory PUF, sensor PUF, optical PUF, monostable PUF, via-PUF, etc. that has sufficient CRPs to support the number of endpoint nodes to be paired for direct secure mutual authentication. In addition, the PUF circuits 144A and 144B of the two endpoint nodes need not be the same. Both wire and wireless interfaces can be used for 148A and 148B as long as the endpoint nodes 140A and 140B use the same communication protocol supported by their enrolled network server. For example, WiFi and network socket for connection may be used. Long-distance communication interfaces like cellular network, Ethernet, short-distance wireless protocols like Bluetooth, RFID, NFC and wired communication like RS232, and USB are also possible. The high-speed chiplets require high bandwidth serial or parallel communication interface between dies or chips. The state-of-the-art serial interfaces are 112G USR/XSR (ultra-short reach, extra-short reach) and parallel interfaces are High Bandwidth Interconnect HBI (an offshoot of HBM) and OpenHBI, BoW (bunch of wires) and Intel Advanced Interface Bus (AIB).

Endpoint node A 140A and endpoint node B 140B are relatively small lightweight devices such as sensor nodes of an IoT system. Therefore, they have limited storage capacity and security. As discussed in more detail below, the processors 142A and 142B of the endpoint nodes are operable to execute a lightweight hash function (for example, sponge-like construction) and a lightweight block cipher optimized for performance in hardware implementation like SIMON [20]. It is assumed that the non-volatile memories 146A and 146B of the end point nodes are not secured and have limited storage capacity.

The enrollment and update controller 120 may be implemented as a server and is assumed to have greater storage and processing capacity than the endpoint nodes. In addition, the enrollment and update controller 120 can securely store a database of challenge response pairs for the endpoint nodes in the secure memory.

The objective of the system 100 is to establish direct mutual authentication and direct secure communications thereafter between the endpoint nodes 140A and 140B by utilizing the on-the-fly key generation property of PUF.

In the following description it is assumed that the CRPs of the endpoint nodes 140A and 140B have already been securely collected in the design house or a trusted entity and securely transmitted to enrollment and update controller 120. The threat model assumes the presence of an attacker who can connect to the network and is able to eavesdrop the communication channel during the authentication process. It is also assumed that the attacker can initiate an unbound number of authentication requests. The attacker cannot break into the secure memory 124, but can have access to the endpoint nodes 140A and 140B to retrieve any stored data in the device. The objective of the attacker is to impersonate any end-devices and steal the secret session key without being detected.

FIG. 2 is a table showing data stored in an enrollment and update controller of a system for physical unclonable function based authentication and key exchange according to an embodiment of the present invention. As shown in FIG. 2, the secure memory 124 of the enrollment and update controller 120 stores the challenge set and response set of the PUF circuit for each device. Endpoint node A 140A has a device ID $ID_A$. The PUF circuit 144A of endpoint node A 140A has a challenge set $C_A$ and a response set $R_A$. Endpoint node B 140B has a device ID $ID_B$. The PUF circuit 144B of endpoint node B 140B has a challenge set $C_B$ and a response set $R_B$. The enrolment phase is firstly conducted in the design house or a trusted entity, where the CRPs of each PUF-embedded chip are collected after fabrication. After which, the direct CRP access paths are permanently removed. Once the customer identity is authenticated, the CRPs will be transferred to the customer's local server for the intended applications. Note that the CRP collection is assumed to be conducted in a secure environment and the transfer of CRPs is also securely completed with the help of various supply chain authentication protocols.

The proposed protocol consists of two phases, i.e., an enrolment and update phase, and a mutual authentication and key exchange phase. The endpoint nodes only have to communicate with the server in the enrollment and update phase. After which, the endpoint nodes can connect and authenticate each other directly.

Embodiments of the present disclosure utilize the Exclusive-OR (XOR) cipher to generate a key mask for a dedicated device pair. The mask can be publicly stored in the device without compromising the security. Its purpose is to enable the endpoint node to securely retrieve the intermediary secret of its pairing endpoint node during the authentication process.

Notations used in the present disclosure are shown in table 1 below.

| Notation | Description |
| --- | --- |
| PUFA(C) (PUFB(C)) | Apply the challenge C to the PUF circuit of endpoint node A (B) |
| H(X) | Hash of X |
| a ⊕ b | Exclusive OR |
| a, b | Concatenation |
| $x \xleftarrow{R} X$ | x is randomly chosen from the set X |
| φ | A key mask |
| h = ECC.gen(X) | Error correction code (ECC) generation phase. It generates the helper data h for the recovery of X |
| X = ECC.rep($\hat{X}$, h) | ECC reproduction phase. It corrects the noisy $\hat{X}$ with the helper data h |
| M = CCM.enc(f, k, m) | CCM encryption of plaintext m with k as the key and f as the underlying block cipher, which could either be a pseudo-random function (PRF) or a pseudo-random permutation (PRP). The output M includes the ciphertext and a tag |
| V = CCM.dec(f, k, M) | CCM decryption of M with k as the key and f as the underlying block cipher. If key k is correct, V = m, where m is the plaintext. Otherwise, an error is returned in V. |
| $\{0, 1\}^l$ | The set of bit strings of length I |

Figure 3:
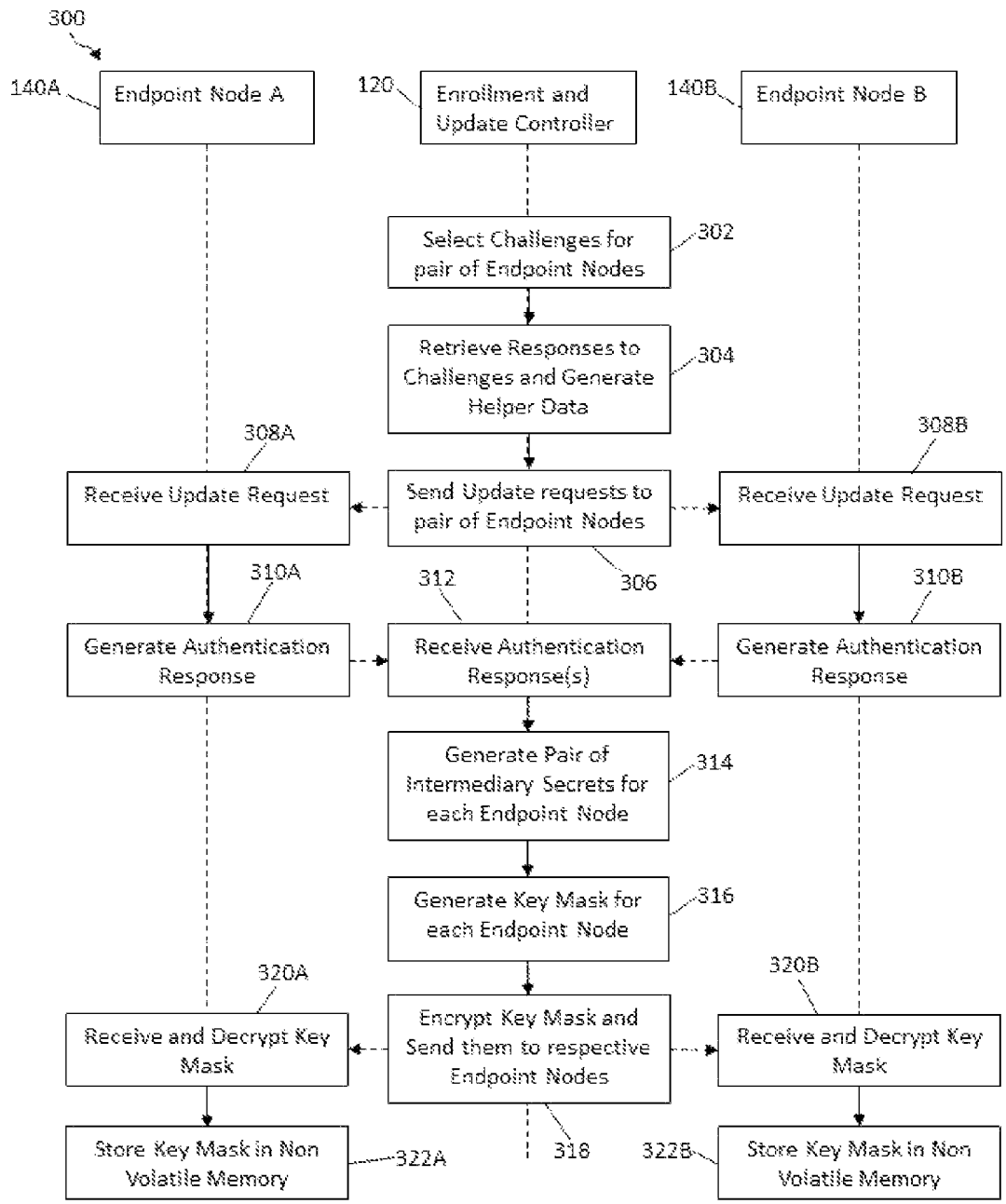
FIG. 3 is a flow diagram showing a method updating data stored on endpoint nodes in an embodiment of the present invention.

FIG. 3 is a flow diagram showing a method updating data stored on endpoint nodes in an embodiment of the present invention. The method 300 shown in FIG. 3 is carried out by the enrollment and update controller 120 and the pair of end point devices: endpoint node A 140A and endpoint node A 140B.

As mentioned above, the secure memory 124 of the enrollment and update controller 120 stores the data described above with reference to FIG. 2.

In step 302, for each intended pair of endpoint nodes (which in this example is endpoint node A and endpoint node B), the enrollment and update controller 120 selects a challenge $C_a$ for A and a challenge $C_b$ for B from their respective challenge sets, $C_A$ and $C_B$.

In step 304, the corresponding responses, $R_a$ and $R_b$, are also retrieved from the secure memory 124. To enable $R_a$ and $R_b$ to be recovered from the noisy responses reproduced by the respective device PUF circuits 144A and 144B in the field, the enrollment and update controller 120 also applies error correcting code (ECC) [21] to $R_a$ and $R_b$ to generate the corresponding helper data, $h_a$ and $h_b$. To ensure the freshness of the session, the server generates two random nonces m and n for endpoint node A and endpoint node B respectively.

In step 306, an update request is sent individually to each respective node (i.e. endpoint node A and endpoint node B). The update request has the following form:

<$ID_{self}$,challenge$_{self}$,$ID_{target}$,challenge$_{target}$,helper_data,nonce> where subscripts 'self' and 'target' refer to the designated device and its pairing device, respectively. An honest endpoint node A (or B) can generate a valid $A_a$ (or $A_b$) to prove its identity to the enrollment and update controller 120.

In step 308A endpoint node A receives its designated update request and generates an authentication response in step 310A. The response is generated as follows: the endpoint node A applies the challenge $C_a$ to its PUF circuit 144A and generates the noisy response $\hat{R}_a$:

$\hat{R}_a$=PUFA($C_a$)

Then, using the helper data $h_a$, the endpoint node A corrects the response:

$$R_a = ECC \cdot rep(\hat{R}_a, h_a)$$

Then, an authentication response $A_a$ is generated as the hash of the corrected response XORed with the received nonce value m:

$$A_a = H(R_a \oplus m)$$

$A_a$ is sent to the enrollment and update controller 120 with a randomly selected I-bit string x:

$$x \xleftarrow{R} \{0,1\}^l$$

Similarly, in step 308B endpoint node B receives its designated update request and generates an authentication response in step 310B. The response is generated as follows: the endpoint node B applies the challenge $C_b$ to its PUF circuit 144B and generates the noisy response $\hat{R}_b$:

$$\hat{R}_b = PUFA(C_b)$$

Then, using the helper data $h_b$, the endpoint node B corrects the response:

$$R_b = ECC \cdot rep(\hat{R}_b, h_b)$$

Then, an authentication response $A_b$ is generated as the hash of the corrected response XORed with the received nonce value n:

$$A_b = H(R_b \oplus n)$$

$A_b$ is sent to the enrollment and update controller 120 with a randomly selected I-bit string y:

$$y \xleftarrow{R} \{0,1\}^l$$

In step 314, the enrollment and update controller 120 authenticates the endpoint nodes by checking if $A_a = H(R_a \oplus m)$ and $A_b = H(R_b \oplus n)$ using the nonce values sent to the respective endpoint nodes and the responses to the selected challenges.

If the endpoints are successfully authenticated, in step 314, the enrollment and update controller 120 calculates a pair of intermediary secrets, $P_1$ and $P_2$, from the response R of each designated endpoint node and the identity of its pairing endpoint node. Thus, for the pair of endpoint node A and endpoint node B, there are two pairs of intermediary secrets: $(P_{1a}, P_{2a})$ and $(P_{1b}, P_{2b})$.

The intermediary secrets are generated using the device identifiers of the partner endpoint nodes as follows:

$$P_{1a} = H(R_a, ID_B)$$

$$P_{2a} = H(P_{1a})$$

$$P_{1b} = H(R_b, ID_A)$$

$$P_{2b} = H(P_{1b})$$

A lightweight cryptographic hash function H is used to boost the entropy of PUF responses and prevent the plain responses from being intercepted. By including the partner's identities ($ID_B$ and $ID_A$) in the calculation of $P_{1a}$ and $P_{1b}$, the two parameters are made to be partner device-specific. Specifically, for endpoint node A, $P_{1a}$ is first calculated by hashing the concatenated $R_a$ and $ID_B$·$P_{2a}$ is then obtained by hashing $P_{1a}$·$P_{1b}$ and $P_{2b}$ are similarly obtained from hashing the concatenated $R_b$ and $ID_A$ consecutively.

In step 316, a key mask ϕ is generated for each endpoint node of the pair by an XOR operation of an intermediary secret of the node A and a corresponding intermediary secret of the node B. Each intermediary secret corresponding to one endpoint node acts as an endpoint node specific XOR cipher decryption key for the retrieval of the other intermediary secret corresponding to the other endpoint node. ϕ needs not to be kept private. It can be stored in the respective non-volatile memories 146A and 146B. Due to the cryptographic secure XOR cipher, the knowledge of ϕ does not help to reveal $P_1$ and $P_2$. Hence, both $P_1$ and $P_2$ can serve as the keys to decrypt a pair of puzzles ($Q_a$ and $Q_b$) designated for an endpoint node with the help of its PUF circuit. These private data are concealed in $\phi_1$ and $\phi_2$ by the XOR cipher construction, $P_{1a} \oplus P_{1b}$ and $P_{2a} \oplus P_{2b}$, respectively.

$$\phi_1 = P_{1a} \oplus P_{1b}$$

$$\phi_2 = P_{2a} \oplus P_{2b}$$

In step 318, the key masks are encrypted and sent to the respective endpoint nodes.

$$X_a = CCM \cdot enc(AES, H(R_a), (x, \phi_2))$$

$$X_b = CCM \cdot enc(AES, H(R_b), (y, \phi_1))$$

Where $X_a$ is the encrypted message sent to endpoint node A and $X_b$ is the encrypted message sent to endpoint node B.

In step 320A, endpoint node A receives and decrypts the message $X_a$:

$$Y_a = CCM \cdot dec(AES, H(R_a), X_a)$$

This is rejected if $Y_a$=error, otherwise, x and $\phi_2$ are retrieved from $Y_a$ and if x is fresh, in step 322A, ($ID_B$, $C_b$, $C_a$, $h_a$, $\phi_2$) is stored in the non-volatile memory 146A of endpoint node A.

Similarly, in step 320B, endpoint node B receives and decrypts the message $X_b$:

$$Y_b = CCM \cdot dec(AES, H(R_b), X_b)$$

This is rejected if $Y_b$=error, otherwise, y and $\phi_1$ are retrieved from $Y_b$ and if y is fresh, in step 322B, ($ID_B$, $C_a$, $C_b$, $h_b$, $\phi_1$) is stored in the non-volatile memory 146B of endpoint node B.

Note that an XOR cipher can act as a one-time pad (OTP) to achieve perfect secrecy, if the length of the random key is at least as long as the plaintext. Besides, the random key must be kept completely secret and never be reused in whole or in part. All these requirements can be fulfilled by the proposed method. Use $\phi_1 = P_{1a} \oplus P_{1b}$ for illustration. $P_{1a}$ and $P_{1b}$ are the outputs of the same hash function, which makes the length of both parameters the same. The "completely secret" requirement is also met by our proposed scheme as $P_{1a}$ and $P_{1b}$ are defined by the PUF responses. They can only be generated by the device when needed and are never stored or transmitted in plaintext. As for the one-time use policy of the OTP, even if the same challenge is picked for a device A to pair with different devices, e.g., B and C, the generated $P_{1a}$ is different for different pairing devices as the hash function used for the generation $P_{1a}$ is dependent on both $R_a$ and its pairing device's unique identity, i.e., $ID_B$ or $ID_C$. Even though an authorized device can retrieve the corresponding $P_1$ or $P_2$ to the allocated challenge for any of its interlocutor, it still cannot impersonate as its interlocutor to communicate with other devices, neither does the attacker.

A device should only accept a fresh authentication mask from an authorized controller that possesses the correct CRPs of the device's PUF. To ensure this, the controller packs the mask $\phi_2$ with the fresh x sent by the endpoint node. The message package is encrypted using counter with cipher block chaining message authentication code (CCM) mode with $H(R_a)$ as the key and Advanced Encryption Standard (AES) as the underlying pseudo-random permutation (PRP). CCM combines cipher block chaining message authentication code (CBC-MAC) and counter (CTR) mode encryption to provide authenticated encryption, which assures both the confidentiality and authenticity of data. Besides, CCM has smaller code size as the decryption block of the underlying block cipher is not required. To decrypt the received message, endpoint node A applies $C_a$ to its PUF circuit to recover the key $H(R_a)$, and performs a decryption upon receiving the message. If the message can be successfully decrypted, it means that the message sender possesses the correct $R_a$. Therefore, endpoint node A can believe that the enrolled or updated message $(ID_A, C_a, ID_B, C_b, h_a, \phi_2)$ is indeed from a trusted local server. If the decrypted x is the same as the fresh x that it sent, device A can confirm the freshness of the updated message, thus the replay of a compromised X, is prevented. Once the authenticity and freshness are confirmed, A stores the information in its local non-volatile memory. Similar process is carried out by device B. The same process can be performed whenever the authentication mask on the end point node's side needs to be updated. In addition to CCM mode, other secure Authenticated Encryption methods such as GCM mode, OCB mode, EAX mode, etc., can be used. In addition to AES, other secure PRF (Pseudo Random Function) or PRP (Pseudo Random Permutation) can be used.

Figure 4A:
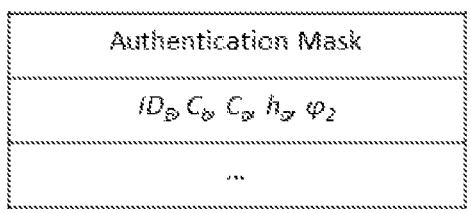
FIG. 4A and FIG. 4B are tables showing data stored on endpoint nodes in an embodiment of the present invention.
Figure 4B:
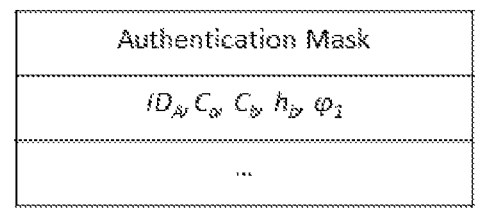

FIG. 4A and FIG. 4B are tables showing data stored on endpoint nodes in an embodiment of the present invention. As shown in FIG. 4A, the data $(ID_B, C_b, C_a, h_a, \phi_2)$ is stored on endpoint node A for authentication and key exchange with endpoint node B. As shown in FIG. 4B, the data $(ID_A, C_a, C_b, h_b, \phi_1)$ is stored on endpoint node B for authentication and key exchange with endpoint node A.

Figure 5:
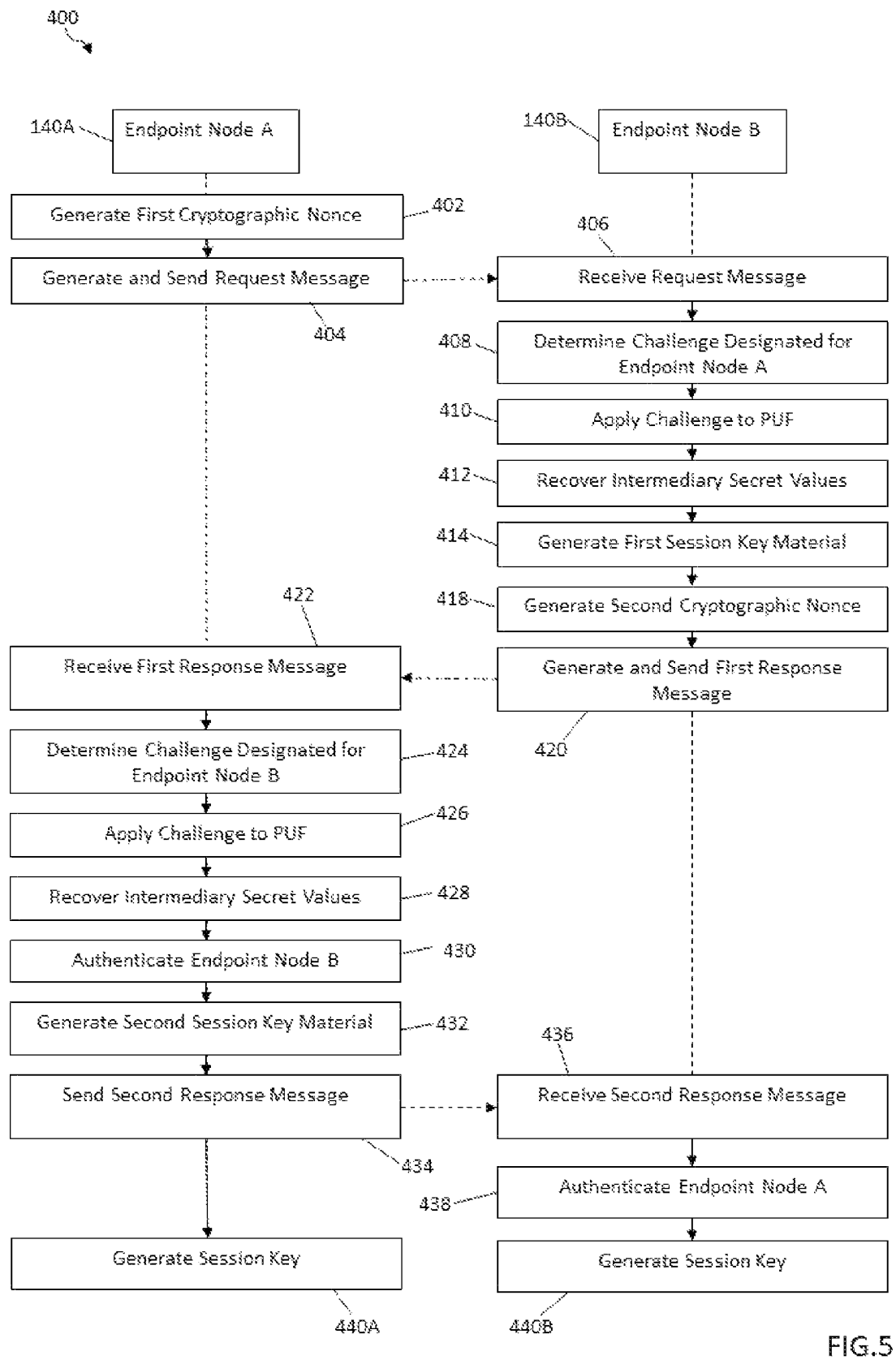
FIG. 5 is a flow chart showing a method mutual authentication and key exchange between endpoint nodes according to an embodiment of the present invention.

FIG. 5 is a flow chart showing a method mutual authentication and key exchange between endpoint nodes according to an embodiment of the present invention. The method 400 shown in FIG. 5 is carried out between two endpoint nodes 140A and 140B for which the method 300 described above with reference to FIG. 3 has been carried out.

In step 402, endpoint node A 140A generates a cryptographic nonce $T_a$ which will be sent to endpoint node B 140B and later used in the authentication of endpoint node B.

In step 404, endpoint node A generates and sends a request message to endpoint node B 140B. The request message $MSG_1$ comprises the identities of the endpoint nodes ($ID_A$ and $ID_B$), the challenges used for the current session ($C_a$ and $C_b$), and the cryptographic nonce ($T_a$).

In step 406, endpoint node B receives the request message.

In step 408, endpoint node B checks the correctness of the message receiver and the existence of requestor and pairing challenges in its local non-volatile memory 146B. If yes, it fetches the enrolled challenge $C_b$, helper data $h_b$ and key mask $\phi_1$ corresponding to ($ID_A, C_a$) from the non-volatile memory 146B.

In step 410, endpoint node B 140B applies the challenge $C_b$ to its embedded PUF circuit 144B to generate a reliable PUF response $R_b$ with the helper data $h_b$.

$\hat{R}_b = (PUFB(C_b))$ $R_b = ECC \cdot rep(\hat{R}_b, h_b)$

In step 412, endpoint node B 140B uses the key mask $\phi_1$, to recover the paired $\widetilde{P_{1a}}$ of A by XORing $\phi_1$ with $P_{1b}$. The latter is the hash of $R_b$ and $ID_A$.

$P_{1b} = H(R_b, ID_A)$ $\widetilde{P_{1a}} = \phi_1 \oplus P_{1b}$

In step 414, endpoint node B generates first session key material $n_a$ which is a random bit string of length l:

$n_a \xleftarrow{R} \{0,1\}^l$

In step 418, endpoint node B generates a second cryptographic nonce $T_b$.

$T_b \xleftarrow{R} \{0,1\}^l$

In step 420, endpoint node B generates and sends a first response message to endpoint node A. The first response message comprises a puzzle $Q_a$ which is generated as ciphertext by encrypting the concatenated message of $n_a$ and the received $T_a$ using CCM encryption.

$Q_a = CCM \cdot enc(AES, \widetilde{P_{1a}}, (n_a, T_a))$

The first response message $MSG_2$ comprises the puzzle $Q_a$ and the second cryptographic nonce $T_b$.

$MSG_2 = \langle Q_a, T_b \rangle$

In step 422, endpoint node A 140A receives the first response message $MSG_2$.

In step 424, endpoint node A 140A reads its non-volatile memory 146A to determine the PUF challenge designated for endpoint node B and retrieves the challenge $C_a$, the helper data $h_a$ and key mask $\phi_2$ from the non-volatile memory 146A.

In step 426, endpoint node A 140A applies the challenge to its PUF circuit 144A and uses the helper data $h_a$ to generate the clean PUF response $R_a$ $\hat{R}_a = (PUFA(C_a))$ $R_a = ECC \cdot rep(\hat{R}_a, h_a)$ In step 428, endpoint node A 140A recovers the intermediary secret values $P_{1a}$ and $P_{2a}$ $P_{1a} = H(R_a, ID_B)$ $P_{2a} = H(P_{1a})$ In step 430, endpoint node A 140A uses the received first response message to authenticate endpoint node B. Endpoint node A uses the intermediary secret value $P_{1a}$ as a decryption key to decrypt the received $Q_a$. If decryption is successful and the decrypted $\widetilde{T_a}$ is equal to $T_a$, A accepts B as the authenticated interlocutor.

$V_a = CCM \cdot dec(AES, P_{1a}, Q_a)$

If $V_a$=error, reject. Else the concatenated message ($\widetilde{T_a}$, $\widetilde{n_a}$) is unpacked from $V_a$. If $\widetilde{T_a} = T_a$ then A authenticates B.

In step 432, endpoint node A generates second session key material. The second session key material $n_b$ is a random bit string of length l:

$$n_b \xleftarrow{R} \{0,1\}^l$$

In step 434, endpoint node A generates a puzzle $Q_b$ for endpoint node B to solve using $\widetilde{P_{2b}}$ as a key. The puzzle is generated as ciphertext.

$$\widetilde{P_{2b}} = \phi_2 \oplus P_{2a}$$

$$Q_b = CCM\text{-}enc(AES, \widetilde{P_{2b}}, (n_b, T_b))$$

Endpoint node A then generates a second response message from this puzzle which is sent to endpoint node B.

In step 436, endpoint node B receives the second response message $MSG_3 = \langle Q_b \rangle$.

In step 438, endpoint node B uses the intermediary secret value $P_{2b}$ as a decryption key to decrypt the received $Q_b$. If $Q_b$ can be successfully decrypted by $P_{2b}$ retrieved from hashing $P_{1b}$, B can further check the freshness of the recovered $\widetilde{T_b}$. If both are valid, B accepts A as its authenticated interlocutor.

$$P_{2b} = H(P_{1b})$$

$$V_b = CCM\text{-}dec(AES, P_{2b}, Q_b)$$

If $V_b$=error, reject. Else the concatenated message ($\widetilde{n_b}$, $\widetilde{T_b}$) is unpacked from $V_b$. If $\widetilde{T_b} = T_b$ then B authenticates A.

In step 440A, endpoint node A 140A generates a session key and in step 440B, endpoint node B 140B generates the session key. Upon the successful mutual authentication, both parties can calculate $sk = H(n_a, n_b) = H(\widetilde{n_a}, n_b) = H(n_a, \widetilde{n_b})$ as the session key and use it directly for encrypted communication. Note that the session secrets, $n_a$ and $n_b$, are independent and ephemeral. Therefore, the calculated session key sk is also fresh and independent. Besides, $\phi_1$ and $\phi_2$ do not have to be stored by both devices. With the current setting, the protocol can also execute successfully if B initiates the protocol first. The only difference is that B will authenticate A first before A authenticates B.

It is noted that the proposed protocol shown in FIG. 5 is efficient but cannot achieve perfect forward secrecy (PFS) if the long-term secrets of the entities are compromised. A small tweak on the protocol can be made to achieve PFS. The idea is to use a trapdoor function. The choice of a trapdoor function can be determined by the application. Thus, in an embodiment, an augmented mutual authentication and key exchange protocol based on the Elliptic Curve Diffie-Hellman (ECDH) problem is introduced. In addition to utilize Elliptic Curve Diffie-Hellman (ECDH) problem for achieving perfect forward secrecy in the augmented protocol, other trapdoor functions like the Diffie-Hellman problem can be used.

To achieve PFS, the enrollment phase of the proposed protocol requires several additional registration steps. The enrollment and update controller chooses a safe elliptic curve E over a finite field $\mathcal{F}_p$, where p is a prime, and then selects $P \in E(\mathcal{F}_p)$ of order n as a generator. The enrollment and update controller publishes $\{E, n, P\}$ as public parameters, which are available to all entities including the adversary. All the other procedures remain the same.

For the augmented protocol, the plaintexts of the puzzles are slightly different. Device B encrypts $(n_a P, T_a)$ instead of $(n_a, T_a)$; Similarly, device A encrypts $(n_b P, T_b)$ to create the puzzle $Q_b$, where $n_a P$ and $n_b P$ are point multiplications over the elliptic curve. In this way, the leakage of long-term secrets, i.e., $R_a$, $R_b$ (or $P_{1a}$, $P_{1b}$), will only provide the adversary with $n_a P$ and $n_b P$. Thanks to the ECDH problem, the adversary is not able to calculate $sk = n_a n_b P$ with this information.

The protocols described above may be implemented as follows. Two Avnet Ultra96-V2 boards are used as the endpoints. Ultra96-V2 is an ARM-based, Xilinx Zynq UltraScale+TM MPSoC ZU3EG A484 development board. It supports PYNQ for Xilinx FPGA device, which means that Python language and libraries are provided for the application development to benefit from both the FPGA programmable logic and ARM microprocessor. A personal computer is used as the controller. The involvement of the controller is only in the enrollment and update phase. Any PUF with good uniqueness and randomness to minimize the probability of response collision or correlation that may be exploited by the attackers can be embedded into the IoT devices. Thus, there is no restriction on the type of PUF which can be used in the protocol. The PUF can be flexibly selected to meet the device resource or any specific application requirements. A highly reliable PUF will relax the error correction requirement. Though with near-perfect reliability has been proposed in the literature, without loss of generality, we assume that the PUFs embedded in the devices have high but not perfect reliability. Therefore, ECC is required as the PUF responses are used for key generation in the proposed scheme. In our experiment, the reliable and modeling resistant Arbiter PUF is chosen for the implementation on the FPGA. The PUF overlay is then loaded through the ARM core for system configuration. The remaining cryptographic modules such as ECC and hash may be directly imported from Python libraries. For demonstration purposes, the proposed protocol may be designed on top of the network socket. The elapsed time from device A initiating the protocol till the completion of mutual authentication and session key generation is less than 1.5 seconds. As only public information, i.e., device identity, challenge, ECC helper data and key mask, are stored in the device, the storage and security requirements in each device are also low.

In the following, the advantages and improvements offered by the protocols described above are discussed. Several relevant solutions have been proposed in the literature [4], [5]-[7] to solve the bottlenecks of the classical PUF-based device authentication schemes. The protocol of [4] combines the PUF with a certificate-less identity based encryption. It requires a verifier node to act as the proxy to authenticate the two IoT endpoints. It also requires the presence of a Security Association Provider (SAP) during the authentication phase to manage the authentication helper data. Besides, the protocol requires the verifier to store a secret hash key in a non-volatile memory (NVM). This requirement has completely defeated the fundamental tenet of using PUF to avoid keeping the secret in local memory.

On the other hand, the Babel-chain PUF-based mutual authentication protocol (BC-PHEMAP) [5] applies the PUF response iteratively to the PUF to create PUF chains for authentication. Since multiple PUF operations (8 in the text example) are required and each PUF operation has to be 100% reliable in order to preserve the enrolled chain result, this scheme is not practical due to the inevitable unreliability of PUF responses in the field. What is more, the BC-PHEMAP scheme reveals raw PUF responses during the protocol executions. The scheme requires strong PUF to ensure the chain or its subset is never reused to pair different devices but this also provides an opportunity for the adversary to collect a large number of used raw responses for modelling attack.

The scheme in [6] also requires a trusted third party server during the mutual authentication of two IoT endpoints. The server is responsible for providing the authentication message and generating the session keys. The protocol trades message exchange times (delays) for zero-storage in the device side and reduced storage requirement in the server side. Two rounds of mutual authentication between the server and the device and one round of mutual authentication between devices are required for a complete protocol run. On a par with [5], it does not take into account the practical PUF reliability issues.

Similar to [4], the work [7] relies on the combination of PUF with a public-key cryptography on elliptic curve to achieve mutual authentication between IoT nodes without the need for a local CRP storage. Each IoT node will obtain its public and private key pair after an enrolment phase with the server in a secure environment. The public keys are stored in the device's memory while the private keys are recovered with the help of the PUF during the authentication phase. 14 rounds of elliptic curve scalar multiplications are required to complete the protocol runs, which increases the computational cost of the protocol significantly.

Based on the above discussions, existing PUF-based authentication schemes, either with or without requiring a CRP storage in the verifier, cannot be used to instantiate a low-cost, key-less, directly authenticated and directly connected P2P IoT network. The protocols of the present disclosure achieve the direct PUF-based mutual authentication and key exchange, and outperforms existing works in both security, computational complexity and communication cost.

Figure 7:
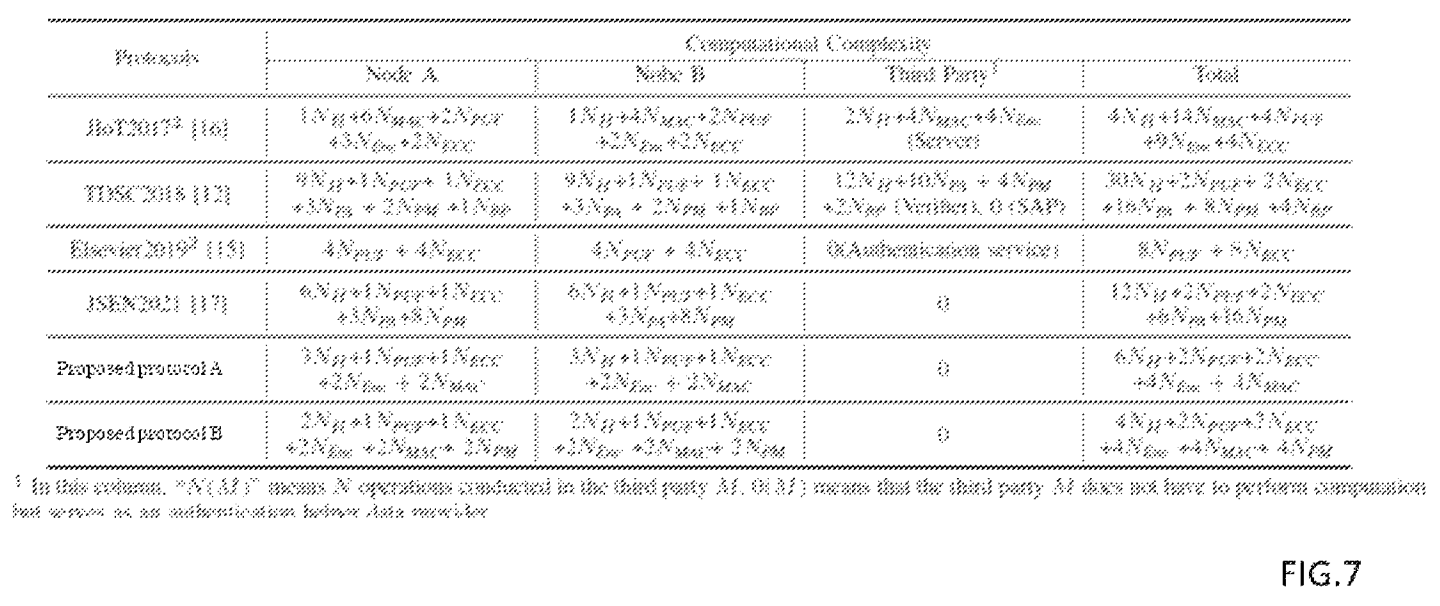
Figure 8:
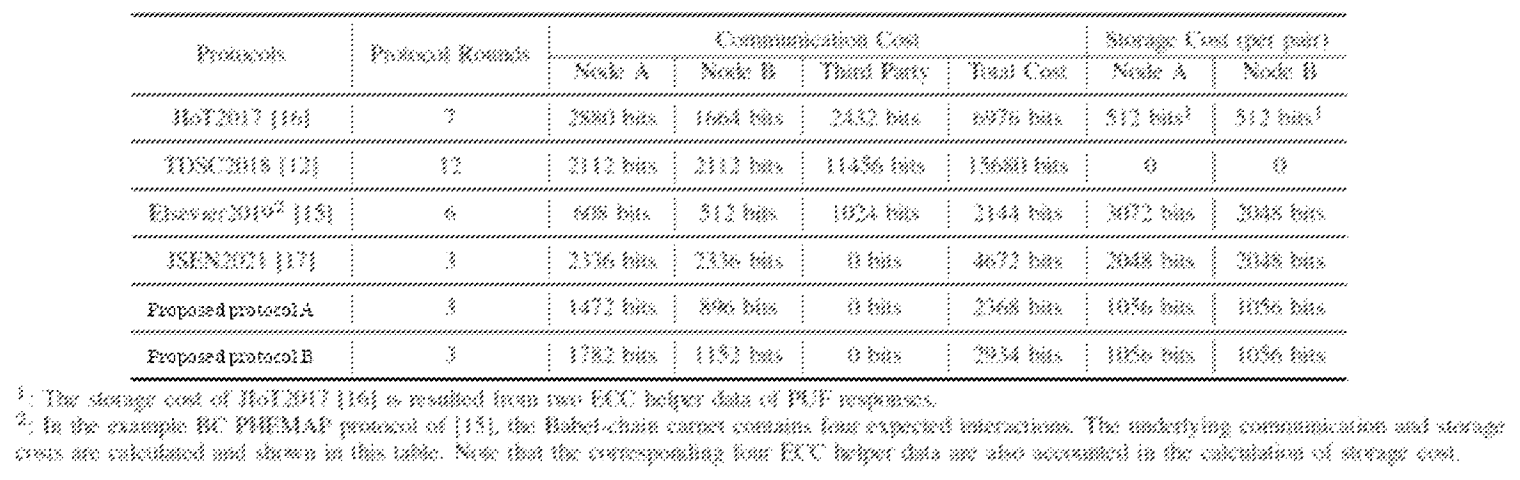

FIG. 6 is a table showing a comparison of protocols against a list of security features, including mutual authentication, secure session key, the requirement of server participation, NVM for storage of secret locally and PFS. In FIG. 6 to FIG. 8, "proposed protocol A" indicates the protocol of described above with reference to FIG. 5, and "proposed protocol B" indicates the protocol with the modification to use ecliptic curves to achieve PFS as described above.

Mutual authentication and secure session key are two fundamental security features to ensure that only the legitimate devices are involved in the communication and the communication is secured with a secret session key. All protocols in comparison can perform mutual authentication. Two protocols, TDSC2018 [4] and Elsevier2019 [5], do not produce secure session key through the authentication process. The protocol TDSC2018 [4] exchanges public key instead and uses public key encryption to secure transmission, which incurs significantly higher computational costs than other protocols that use symmetric key cryptography. Except the protocol JSEN2021 [7] and our proposed protocols, all other protocols [4], [5], [6] require server participation for mutual authentication. Involving server participation during the authentication process is inefficient and not well-suited to P2P IoT scenarios. It requires more protocol rounds and incurs extra latency. Storing secrets locally on the device's NVM make the protocol TDSC2018 [4] vulnerable to memory attacks. Lack of PFS makes the previous communication messages vulnerable to long-term secret leakage in protocols like JIoT2017 [6], Elsevier2019 [5]. Protocol JSEN2021 [7] and the proposed protocol B stand out as the only two candidates that meet all the desirable security features for securing mutual authentication and key exchange in P2P IoT setting.

FIG. 7 is a table showing a comparison of computational complexity for protocols. The computational complexity listed for each protocol includes computations performed during the mutual authentication and key exchange phase at both the device node and the participating third-party node (if any). Let $N_H$, $N_{MAC}$, $N_{PUF}$, $N_{ECC}$, $N_{Enc}$, $N_{PA}$, $N_{PM}$ and $N_{BP}$ denote the numbers of rounds of hash function, message authentication code (MAC), PUF, error correction code for PUF, encryption and decryption, point addition over elliptic curve, point multiplication over elliptic curve and bilinear pairing, respectively. Since the proposed protocol does not dictate the type of cryptographic modules such as PUF and hash as long as they meet the required functionality with acceptable implementation cost, FIG. 7 only lists the names of the cryptographic modules for a fair comparison. Similarly, for an implementation platform-independent comparison of computational complexity, the number of rounds for each required operation is listed and compared. Trivial operations like concatenation or bitwise exclusive OR are omitted without impacting the relative accuracy of the comparison.

As shown in FIG. 7, protocols, TDSC2018 [4], Elsevier2019 [5] and JIoT2017 [6], all require a third party to complete the mutual authentication between devices. Among the existing protocols, TDSC2018 [4] and JSEN2021 [7] have the highest computational complexity as they both require compute-intensive public-key cryptography over elliptic curve. The protocol TDSC2018 [4] requires 16 point additions, 8 point multiplications and 4 bilinear pairing operations to be performed in total while the protocol JSEN2021 [7] requires 6 rounds of point addition and 16 rounds of point multiplication. A point addition and a point multiplication over elliptic curve secp256r1 consume around 2.56 ms and 112.34 ms, respectively, on TI's CC2538 SoC (in comparison, SHA256 only consumes around 0.061 ms in the same platform) [7]. Bilinear pairing has been widely regarded as an expensive operation for terminal devices. The present invention does not need point multiplication and elliptic curve cryptography unless PFS is required. If PFS is needed, the proposed augmented protocol B of the present invention needs only two point multiplications on each device to achieve PFS. The protocol Elsevier2019 [5] is lightweight but its practicality is severely constrained by the PUF reliability problem. Besides, discussed above, it is also vulnerable to modeling attacks. The number of cost-effective hash operation rounds of JIoT2017 [6] is similar to the proposed protocols, but JIoT2017 [6] requires more MAC, encryption/decryption, PUF and the associated ECC operations. Therefore, its overall complexity is estimated to be higher than the proposed protocol besides its need for a trust server. In addition to the high performance, privacy and security achievable without the need for a trusted third party, our proposed protocol outperforms other existing schemes in terms of its low component cost for direct P2P authentication and the avoidance of storing a secret key locally.

FIG. 8 is a table showing a comparison of communication and storage costs for protocols. Another important factor for protocol comparison is the communication bandwidth and storage costs, which can be calculated for each device pair. Note that global public parameters like the elliptic curve to be used are not accounted. Following the same generalization setting in [7], the device identities and timestamps are assumed to be 32 bits, the outputs of hash, private keys, random nonces, and challenges and responses of PUFs are all recommended to be 256 bits. The tag produced by MAC operations is assumed to be 128 bits. As for elliptic curve points, we assume each point ($P_x$, $P_y$) is 512 bits, where $P_x$ and $P_y$ denote the 256-bit x and y coordinates, respectively. Besides, we assume the encryption method used in [6] is also the CTR-mode encryption and the ciphertext and plaintext are assumed to have the same length. As shown in FIG. 8, those protocols that involve a third party in the mutual authentication process, i.e., JIoT2017 [6], TDSC2018 [4] and Elsevier2019 [5], require a higher number of message exchanges. Though the first two protocols [4], [6] have minimum storage cost per device pair, their respective total communication cost is much higher than other protocols in comparison. Each of the two proposed protocols can be completed with only three message passes, and consumes very low bandwidth (around 3,000 bits) and storage (around 1,000 bits).

In summary, based on the results of the comparison in FIG. 6 to FIG. 8, the proposed PUF-based mutual authentication and key exchange protocols provide a very high-level of security and require comparatively low computational complexity, communication bandwidth and storage cost.

Thus, embodiments of the present invention enable direct connections between IoT devices. Data is only stored in the local devices without storing in a central server, which provides high security and privacy, and low latency and development cost. The proposed protocol can be used to benefit smart home applications, e.g., remote control of security cameras or smart locks, or drone remote control and surveillance, or communication between a window actuator and its external weather station, and so on. In such applications, the proposed protocol allows the host to turn on the smart lock or water heater using their phones remotely; to see a live video feed on their smartphone directly, or control the drone with low latency, or adjust the window quickly according to the outside weather conditions. With no need of a relay server, this greatly reduces an expensive and long-term cost of server traffic. Besides, the proposed protocol enables end-to-end data encryption, which can protect information like the video streaming from being leaked. Unlike existing hardware-based or software-based solutions, no secrets are required to be stored in those IoT devices, which greatly reduces the risk of tampering attacks.

Whilst the foregoing description has described exemplary embodiments, it will be understood by those skilled in the art that many variations of the embodiments can be made within the scope and spirit of the present invention. As the present invention is platform and communication interface agnostic, its application is not limited to securing off-chip communication. One good example of on-chip P2P network is a System-in-Package (SiP) chip, where smaller chiplets replace a large functional equivalent monolithic System-on-Chip (SoC), While disaggregating SoC into multiple chiplets offer numerous cost and performance advantages, it also increases the attack surface. Chiplets are exposed to rising risks of hardware-based trojans and man-in-the-middle (MITM) attacks. This invention provides a solution to authenticate the legitimacy of third-party chiplets and protect sensitive data transfers among chiplets to prevent them from being eavesdropped or sabotaged.

REFERENCES

[1] J. R. Wallrabenstein, "Practical and secure IoT device authentication using physical unclonable functions," in Proc. 2016 IEEE 4th Int. Conf. Future Internet Things Cloud (FiCloud). Vienna, Austria: IEEE, August 2016, pp. 99-106.
[2] T. Idriss and M. Bayoumi, "Lightweight highly secure PUF protocol for mutual authentication and secret message exchange," in Proc. 2017 IEEE Int. Conf. RFID Technol. Appl. (RFID-TA). Warsaw, Poland: IEEE, 2017, pp. 214-219.
[3] P. Gope and B. Sikdar, "Lightweight and privacy-preserving two-factor authentication scheme for IoT devices," IEEE Internet Things J., vol. 6, no. 1, pp. 580-589, February 2018.
[4] U. Chatterjee, V. Govindan, R. Sadhukhan, D. Mukhopadhyay, R. S. Chakraborty et al., "Building PUF based authentication and key exchange protocol for IoT without explicit CRPs in verifier database," IEEE Trans. Dependable Secure Comput., vol. 16, no. 3, pp. 424-437, May-June 2018.
[5] M. Barbareschi, A. De Benedictis, E. La Montagna, A. Mazzeo, and N. Mazzocca, "A PUF-based mutual authentication scheme for cloud-edges IoT systems," Future Generation Comput. Syst., vol. 101, pp. 246-261, December 2019.
[6] M. N. Aman, K. C. Chua, and B. Sikdar, "Mutual authentication in IoT systems using physical unclonable functions," IEEE Internet Things J., vol. 4, no. 5, pp. 1327-1340, October 2017.
[7] S. Li, T. Zhang, B. Yu, and K. He, "A provably secure and practical PUF-based end-to-end mutual authentication and key exchange protocol for IoT," IEEE Sensors J., vol. 21, no. 4, February 2021.

The invention claimed is:
1. A method, in a first endpoint node, of authentication and key exchange with a second endpoint node, the method comprising:
   generating a first cryptographic nonce;
   sending a request message to the second endpoint node, the request message comprising the first cryptographic nonce;
   determining a challenge for a physical unclonable function circuit of the first endpoint node and a key mask designated for the first endpoint node to use for authentication and key exchange with the second endpoint node;
   applying the challenge to the physical unclonable function circuit of the first endpoint node and thereby generating a physical unclonable function response;
   obtaining a first intermediary secret value from the physical unclonable function response;
   receiving a response message from the second endpoint node, the response message comprising: first ciphertext and a second cryptographic nonce, the first ciphertext having been generated by the second node from the first cryptographic nonce and first session key material using the first intermediary secret value;
   decrypting the first ciphertext in the response message using the first intermediary secret value to obtain a decrypted first cryptographic nonce and decrypted first session key material;
   comparing the decrypted first cryptographic nonce with the first cryptographic nonce generated on the first endpoint node and authenticating the second endpoint node if the decrypted first cryptographic nonce matches the first cryptographic nonce generated on the first endpoint node;
   obtaining a second intermediary secret value from the first intermediary secret value using the key mask desig- nated for the first endpoint node to use for authentication and key exchange with the second endpoint node;
generating second session key material;
generating second ciphertext from the second session key material and the second cryptographic nonce using the second intermediary secret value;
sending the second ciphertext to the second node; and
generating a session key for encrypted communication with the second endpoint node from the first session key material and the second session key material.

2. The method according to claim 1, wherein the first intermediary secret value is obtained by applying a hash function to physical unclonable function response and an identifier of the second endpoint node and the second intermediary secret value is obtained from an XOR operation of the key mask and the first intermediary secret value.

3. The method according to claim 1, wherein generating second ciphertext from the second session key material and the second cryptographic nonce using the second intermediary secret value comprises encrypting the second session key material and the second cryptographic nonce using the second intermediary secret value.

4. The method according to claim 1, wherein generating second ciphertext from the second session key material and the second cryptographic nonce using the second intermediary secret value comprises using a trapdoor function.

5. The method according to claim 4, wherein the trapdoor function comprises carrying out a point multiplication over an elliptic curve on the second session key material to obtain an elliptic curve point multiplied second session key material and encrypting the elliptic curve point multiplied second session key material and the second cryptographic nonce using the second intermediary secret value.

6. The method according to claim 1, wherein decrypting the first ciphertext using the first intermediary secret value and/or encrypting the second session key material and the second cryptographic nonce using the second intermediary secret value comprises applying an authenticated encryption method.

7. The method according to claim 6, wherein the authenticated encryption method is a counter with cipher block chaining message authentication code method, a Galois/Counter mode method, an offset codebook mode method or an encrypt-then-authenticate-then-translate method.

8. A method of facilitating authentication and encrypted communication between a first endpoint node and a second endpoint node, the method comprising:
selecting a first challenge for a physical unclonable function circuit of the first endpoint node and a second challenge for a physical unclonable function circuit of the second endpoint node, wherein the physical unclonable function circuit of the first endpoint node outputs a first challenge response in response to the first challenge and physical unclonable function circuit of the second endpoint node outputs a second challenge response in response to the second challenge;
generating a first key mask using the first challenge response and the second challenge response such that the first key mask encodes a first intermediary secret value of the first endpoint node and a first intermediary secret value of the second endpoint node;
generating a second key mask using the first challenge response and the second challenge response such that the second key mask encodes a second intermediary secret value of the first endpoint node and a second intermediary secret value of the second endpoint node;
providing a key mask for the second endpoint node encrypted by the second challenge response to the second endpoint node; and
providing a key mask for the first endpoint node encrypted by the first challenge response to the first endpoint node, wherein the key mask for the second endpoint node is one of the first key mask and the second key mask and the key mask for the first endpoint node is the other of the first key mask and the second key mask.

9. A method according to claim 8, wherein the first intermediary secret value of the first endpoint node is obtained from a hash function of a concatenation of the first challenge response and an identifier of the second endpoint node, the first intermediary secret value of the second endpoint node is obtained from a hash function of a concatenation of the second challenge response and an identifier of the first endpoint node, the second intermediary secret value of the first endpoint node is obtained from a hash function of the first intermediary secret value of the first endpoint node, and the second intermediary secret value of the second endpoint node is obtained from a has function of the first intermediary secret value of the second endpoint node.

10. A method according to claim 8, further comprising authenticating the first endpoint node by sending a first cryptographic nonce to the first endpoint node and comparing a response received from the first endpoint node with an expected function of the first cryptographic nonce and the first challenge response.

11. A method according to claim 8, further comprising generating first error correcting code helper data and second error correcting code helper data respectively using the first challenge response and the second challenge response.

12. An endpoint node comprising:
a physical unclonable function circuit configured to generate physical challenge responses in response to respective challenges;
a memory storing:
an indication of an identifier of a second endpoint node;
an indication of a challenge designated for the second endpoint node to use for authentication and key exchange;
an indication of a challenge designated for the endpoint node to use for authentication and key exchange with the second endpoint node;
and
a key mask designated for the endpoint node to use for authentication and key exchange with the second endpoint node;
a communication interface configured for communication with the second endpoint node; and
a processor configured to:
generate a first cryptographic nonce;
send a request message to the second endpoint node, the request message comprising the first cryptographic nonce;
apply the challenge designated for the endpoint node to use for authentication and key exchange with the second endpoint node to the physical unclonable function circuit and thereby generate a physical unclonable function response;
obtain a first intermediary secret value of the endpoint node from the physical unclonable function response;
receive a response message from the second endpoint node, the response message comprising: first ciphertext and a second cryptographic nonce, the first ciphertext having been generated by the second node from the first cryptographic nonce and first session key material using the first intermediary secret value;

decrypt the first ciphertext in the response message using the first intermediary secret value of the endpoint node to obtain a decrypted first cryptographic nonce and decrypted first session key material;

compare the decrypted first cryptographic nonce with the first cryptographic nonce generated on the endpoint node and authenticate the second endpoint node if the first ciphertext is decrypted successfully and the decrypted first cryptographic nonce matches the first cryptographic nonce generated on the endpoint node;

obtain a second intermediary secret value of the second endpoint node from the first intermediary secret value of the endpoint node using the key mask designated for the first endpoint node to use for authentication and key exchange with the second endpoint node;

generate second session key material;

generate second ciphertext from the second session key material and the second cryptographic nonce using the second intermediary secret value of the second endpoint node;

send the second ciphertext to the second endpoint node; and generate a session key for encrypted communication with the second endpoint node from the first session key material and the second session key material.

13. An endpoint node comprising:
a physical unclonable function circuit configured to generate physical challenge responses in response to respective challenges;
a memory storing:
an indication of an identifier of a second endpoint node
an indication of a challenge designated for the second endpoint node to use for authentication and key exchange;
an indication of a challenge designated for the endpoint node to use for authentication and key exchange with the second endpoint node;
a key mask designated for the endpoint node to use for authentication and key exchange with the second endpoint node;
a communication interface configured for communication with the second endpoint node; and
a processor configured to:
receive a request message from the second endpoint node, the request message comprising the first cryptographic nonce;
apply the challenge designated for the endpoint node to use for authentication and key exchange with the second endpoint node to the physical unclonable function circuit and thereby generate a physical unclonable function response;
obtain a first intermediary secret value of the endpoint node from the physical unclonable function response;
obtain a first intermediary secret value of the second endpoint node using the key mask designated for the endpoint node to use for authentication and key exchange with the second endpoint node;
generate first session key material;
generate first ciphertext from the first cryptographic nonce and first session key material using the first intermediary secret value of the second endpoint node;
generate a second cryptographic nonce;
send the first ciphertext and the second cryptographic nonce to the second endpoint node;

receive second ciphertext from the second endpoint node;
decrypt the second ciphertext using the second intermediary secret value of the endpoint node to obtain a decrypted second cryptographic nonce and decrypted second session key material;
compare the decrypted second cryptographic nonce with the second cryptographic nonce generated on the endpoint node and authenticate the second endpoint node if the second ciphertext is successfully decrypted and the decrypted second cryptographic nonce matches the second cryptographic nonce generated on the endpoint node;
generate a session key for encrypted communication with the second endpoint node from the first session key material and the second session key material.

14. The endpoint node according to claim 12, wherein the first intermediary secret value of the endpoint node is obtained by applying a hash function to the physical unclonable function response and an identifier of the other endpoint node, and the second intermediary secret value is obtained by applying a hash function to the first intermediary secret value.

15. The endpoint node according to claim 12, wherein the processor is further configured to generate the second ciphertext from the second session key material and the second cryptographic nonce using the second intermediary secret value by encrypting the second session key material and the second cryptographic nonce using the second intermediary secret value.

16. The endpoint node according to claim 12, wherein the processor is further configured to generate second ciphertext from the second session key material and the second cryptographic nonce using the second intermediary secret value comprises using a trapdoor function.

17. The endpoint node according to claim 12, wherein the processor is further configured to decrypt the first ciphertext using the first intermediary secret value and/or encrypting the second session key material and the second cryptographic nonce using the second intermediary secret value by applying an authenticated encryption method.

18. The endpoint node according to claim 17, wherein the authenticated encryption method is a counter with cipher block chaining message authentication code method, a Galois/Counter mode method, an offset codebook mode method or an encrypt-then-authenticate-then-translate method.

19. The endpoint node according to claim 12, wherein the memory further stores error correction code helper data for the reconciliation of the challenge response generated by the physical unclonable function circuit, and the processor is further configured to use the error correction code helper data to apply the challenge designated for the endpoint node to use for authentication and key exchange with the second endpoint node to the physical unclonable function circuit and thereby generate a physical unclonable function response.

20. A controller for facilitating authentication and encrypted communication between a first endpoint node and a second endpoint node, the controller being configured to:
select a first challenge for a physical unclonable function circuit of the first endpoint node and a second challenge for a physical unclonable function circuit of the second endpoint node, wherein the physical unclonable function circuit of the first endpoint node outputs a first challenge response in response to the first challenge and physical unclonable function circuit of the second endpoint node outputs a second challenge response in response to the first challenge;

generate a key mask for the second endpoint node using the first challenge response and the second challenge response such that the key mask for the second endpoint node encodes first intermediary secret value of the first node and a first intermediary secret value of the second endpoint node;

generate a key mask for the first endpoint node using the first challenge response and the second challenge response such that the key mask for the first endpoint node encodes a second intermediary value secret of the first endpoint node and a second intermediary secret value of the second endpoint node;

provide the key mask for the second endpoint node encrypted by the second challenge response to the second endpoint node; and provide the key mask for the first endpoint node encrypted by the first challenge response to the first endpoint node.

* * * * *